United States Patent
Boland et al.

(10) Patent No.: US 9,632,977 B2
(45) Date of Patent: Apr. 25, 2017

(54) SYSTEM AND METHOD FOR ORDERING PACKET TRANSFERS IN A DATA PROCESSOR

(71) Applicant: FREESCALE SEMICONDUCTOR, INC., Austin, TX (US)

(72) Inventors: Timothy G. Boland, Phoenix, AZ (US); Anne C. Harris, Chandler, AZ (US); Steven D. Millman, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 592 days.

(21) Appl. No.: 13/801,576

(22) Filed: Mar. 13, 2013

(65) Prior Publication Data
US 2014/0281390 A1  Sep. 18, 2014

(51) Int. Cl.
G06F 9/46 (2006.01)
G06F 15/78 (2006.01)
G06F 9/50 (2006.01)

(52) U.S. Cl.
CPC .......... *G06F 15/7825* (2013.01); *G06F 9/466* (2013.01); *G06F 9/5038* (2013.01)

(58) Field of Classification Search
None
See application file for complete search history.

(56) References Cited

U.S. PATENT DOCUMENTS

| 5,414,845 | A | 5/1995 | Behm et al. |
| 5,564,062 | A | 10/1996 | Meaney et al. |
| 5,826,081 | A | 10/1998 | Zolnowsky |
| 5,835,765 | A | 11/1998 | Matsumoto |
| 5,978,830 | A | 11/1999 | Nakaya et al. |
| 5,999,965 | A | 12/1999 | Kelly |
| 6,374,286 | B1 | 4/2002 | Gee et al. |
| 6,477,562 | B2 * | 11/2002 | Nemirovsky ......... G06F 9/3851 712/23 |
| 6,587,466 | B1 | 7/2003 | Bhattacharya et al. |
| 6,721,309 | B1 | 4/2004 | Stone et al. |
| 6,769,125 | B2 | 7/2004 | Menges et al. |
| 6,938,252 | B2 | 8/2005 | Baylor et al. |
| 6,975,629 | B2 | 12/2005 | Welin |

(Continued)

FOREIGN PATENT DOCUMENTS

EP    1326400 B1 *  9/2007

OTHER PUBLICATIONS

U.S. Appl. No. 13/524,947, filed Jun. 15, 2012, entitled "System and Method for Improved Job Processing to Reduce Contention for Shared Resources".

(Continued)

*Primary Examiner* — Lewis A Bullock, Jr.
*Assistant Examiner* — Kevin X Lu

(57) ABSTRACT

A data processor includes a packet selector. The packet selector creates an ordered list of packets, each packet corresponding to a respective communication flow, determines whether each packet in the ordered list of packets is eligible for transfer to a prefetch unit based on whether a preceding packet in the same communication flow has been transferred to the prefetch unit, and sets a selection priority for each packet based on start time constraints for the respective communication flow, and based on a processing status of a preceding packet in the communication flow.

17 Claims, 6 Drawing Sheets

(56) References Cited

U.S. PATENT DOCUMENTS

| | | |
|---|---|---|
| 7,042,887 B2 | 5/2006 | Sampath et al. |
| 7,073,174 B2 | 7/2006 | Volkoff et al. |
| 7,149,230 B2 | 12/2006 | Coffin, III et al. |
| 7,280,548 B2 * | 10/2007 | Sampath et al. ............ 370/401 |
| 7,316,017 B1 | 1/2008 | Jacobson et al. |
| 7,349,398 B1 | 3/2008 | Favor et al. |
| 7,380,038 B2 | 5/2008 | Gray |
| 7,451,183 B2 | 11/2008 | Romero et al. |
| 7,500,098 B2 | 3/2009 | Paatero |
| 7,512,728 B2 | 3/2009 | Tseng |
| 7,644,408 B2 | 1/2010 | Kroening |
| 7,649,901 B2 | 1/2010 | Musoll et al. |
| 7,810,094 B1 | 10/2010 | McClure et al. |
| 7,836,448 B1 | 11/2010 | Farizon et al. |
| 7,895,431 B2 | 2/2011 | Bouchard et al. |
| 8,316,368 B2 | 11/2012 | Vestal et al. |
| 8,503,323 B2 | 8/2013 | Welin |
| 2002/0116248 A1 | 8/2002 | Amit et al. |
| 2003/0135861 A1 * | 7/2003 | Sinz .................. H04N 21/2221 725/93 |
| 2003/0189573 A1 | 10/2003 | Dahlen et al. |
| 2003/0217224 A1 | 11/2003 | Watts |
| 2003/0223442 A1 | 12/2003 | Huang et al. |
| 2004/0024915 A1 | 2/2004 | Abe |
| 2004/0160446 A1 | 8/2004 | Gosalia et al. |
| 2005/0033889 A1 | 2/2005 | Hass et al. |
| 2005/0141503 A1 | 6/2005 | Welfeld |
| 2010/0103938 A1 | 4/2010 | Musoll et al. |
| 2010/0293353 A1 | 11/2010 | Sonnier et al. |
| 2010/0318996 A1 | 12/2010 | Harris et al. |

OTHER PUBLICATIONS

U.S. Appl. No. 13/524,918, filed Jun. 15, 2012, entitled "System and Method for Improved Job Processing".

Jones et al., "The Impact of Information Availability and Workload Characteristics on the Performance of Job Co-Allocation in Multi-Clusters," 2006 IEEE 2006 IEEE International Conference on Parallel and Distributed Systems, Jan. 2006, pp. 1-10.

Wei et al., "Contract Net Based Scheduling Approach Using Interactive Bidding for Dynamic Job Shop Scheduling," 2007, IEEE International Conference on Integration Technology, Mar. 20-24, 2007, pp. 1-6.

Non-Final Office Action mailed Oct. 27, 2011 for U.S. Appl. No. 12/483,501, 21 pages.

Final Office Action mailed Jun. 8, 2012 for U.S. Appl. No. 12/483,501, 15 pages.

Notice of Allowance mailed Dec. 26, 2012 for U.S. Appl. No. 12/483,501, 17 pages.

Non-Final Office Action mailed Nov. 20, 2014 for U.S. Appl. No. 13/524,918, 17 pages.

Non-Final Office Action mailed Jun. 5, 2014 for U.S. Appl. No. 13/524,947, 12 pages.

Final Office Action mailed Jan. 5, 2015 for U.S. Appl. No. 13/524,947, 12 pages.

Notice of Allowance mailed Feb. 23, 2015 for U.S. Appl. No. 13/524,947, 14 pages.

* cited by examiner

SYSTEM AND METHOD FOR ORDERING PACKET TRANSFERS IN A DATA PROCESSOR

CROSS-REFERENCE TO RELATED APPLICATION(S)

The present application is related to co-pending U.S. patent application Ser. No. 13/524,947, entitled "SYSTEM AND METHOD FOR IMPROVED JOB PROCESSING," filed on Jun. 15, 2012, and U.S. patent application Ser. No. 13/524,918, entitled "SYSTEM AND METHOD FOR IMPROVED JOB PROCESSING TO REDUCE CONTENTION FOR SHARED RESOURCES," filed on Jun. 15, 2012, the entirety of which are herein incorporated by reference.

FIELD OF THE DISCLOSURE

This disclosure generally relates to data processing, and more particularly to a system and method for ordering packet transfers in a data processor.

BACKGROUND

In many data processing applications, including those used in networking and communication applications, input data is provided to the processing system in a number of packetized data streams. Packets that belong to the same stream are typically processed using the same ancillary data, sometimes referred to as commands and context, such as state information for the packets, operands from a memory, and other data. Example ancillary data can include security keys or tokens, for use in processing streams associated with encrypting and/or decrypting data, and other metadata used to process data packets. Often, the data processing operations are offloaded from the main processing architecture to specialized hardware that performs the various data processing operations. Systems often limit the number of packets from the same stream that can be in a prioritization queue/prefetch module at the same time to allow packets from other streams to reside in the queue contemporaneously.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
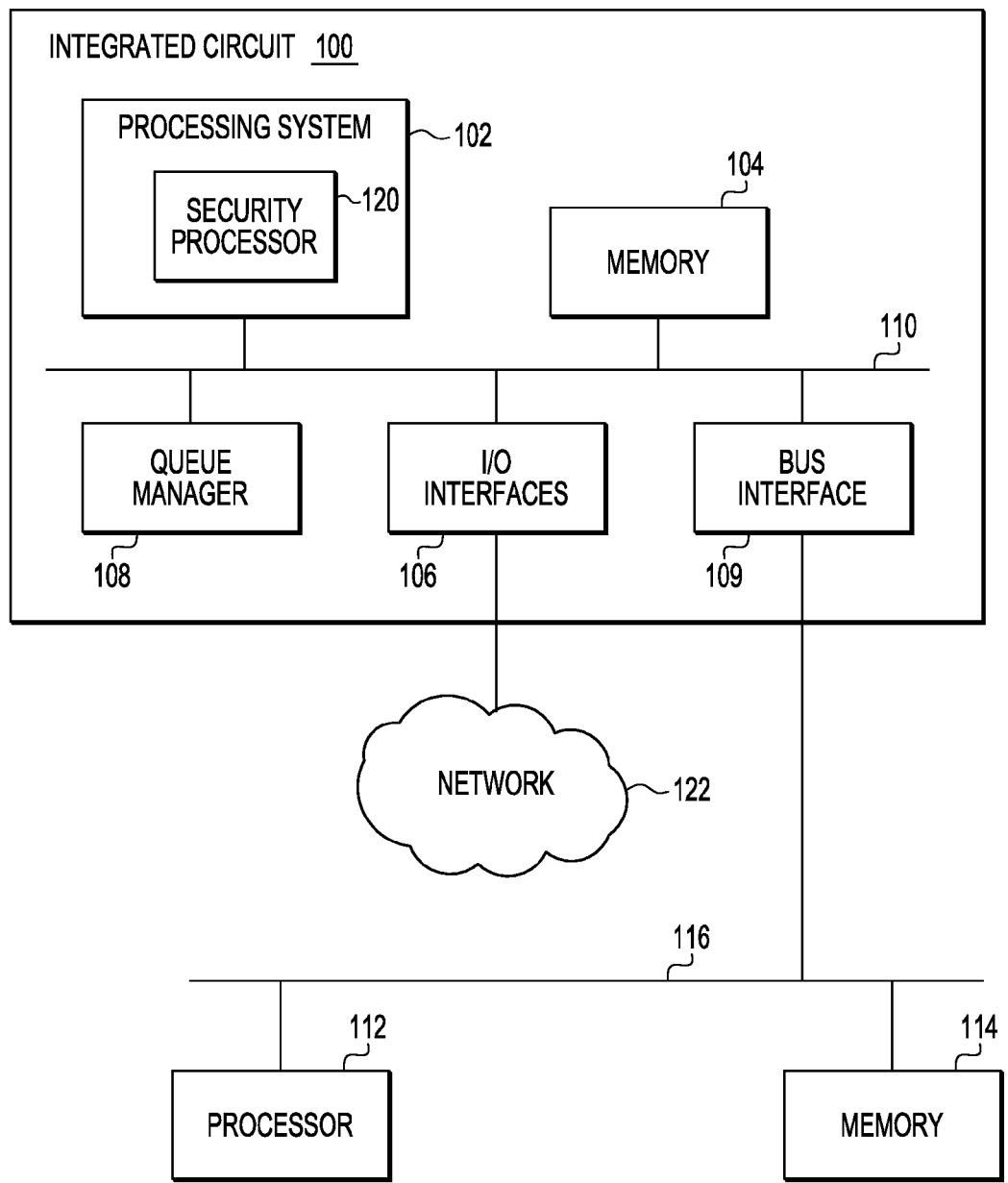
FIG. 1 is a block diagram showing components of an embodiment of a data processing system in accordance with at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

A data processing system can have multiple packet streams, also referred to herein as flows, that provide data to processors for execution. The flows can be ordered communication flows, such that a packet in a communication flow cannot be processed before a preceding packet of the same communication flow. A packet selector of the data processing system can provide the packets to a prioritization queue/prefetch module, which will be referred to herein as a prefetch unit. The prefetch unit can retrieve ancillary data associated with the packets received from the packet selector, and can combine each packet with its respective ancillary to create a job for the data processor. In an embodiment, the ancillary data can be commands and context for the packet that can be utilized by the processor while executing the packet.

The packet selector can first determine whether a packet is eligible for transfer to the prefetch unit, and can then assign a selection priority to the packet if the packet is eligible for transfer. The packet selector can determine that a packet is eligible for transfer if a preceding packet in the ordered communication flow is in the prefetch unit, is being processed, or if the processing of the preceding packet is complete. In response to being eligible for transfer, the packet selector can then assign priority levels to the packet based on start time constraints of the communication flow and a processing status of a preceding packet in the same communication flow. Start time constraints of a communication flow can be restrictions on when a packet of the communication flow can be processed based on the processing of a preceding packet of the same communication flow.

For example, a start time constraint for a particular communication flow can define that the processing of a packet has to wait until the processing of a preceding packet of the same communication flow is completed. Another start time constraint for a particular communication flow can define that the processing of a packet has to wait until the processing of a preceding packet of the same communication flow has been partially completed. Another start time constraint for a particular communication flow can define that the processing of a packet has to wait until the processing of a preceding packet of the same communication flow has started.

The packet selector can assign a highest priority level to a packet if the packet is the first packet of a communication flow. The packet selector can also assign a packet a highest priority level if the processing of a preceding packet in the same communication flow has started or is complete. The packet selector can assign the packet a second highest priority if a preceding packet in the communication flow is in the prefetch unit and a start time constraint of the communication flow for the packet being prioritized allows processing of the packet to start immediately after the start of the preceding packet. In this case, the blocking of the next packet by the preceding packet is minimal based on being able to assign the next packet to a processor immediately after the preceding packet. In different embodiments, a processor can be a single processor, a processor core within a processor, or a process running on the processor or processor core.

The packet selector can assign the next packet a third highest priority if the preceding packet is in the prefetch unit and the start time constraint causes the packet to wait, e.g., processing of the packet is delayed, until partial completion of the preceding packet is completed. In this case, the amount of blocking by the preceding packet is limited, e.g., the delay caused by processing of the previous packet, since the next packet can be assigned to a processor before the execution of the preceding packet is complete. The packet selector can also identify a packet as not eligible for transfer to the prefetch unit, if the preceding packet in the same communication flow is in the prefetch unit and the start time constraint of the communication flow causes the processing of the preceding packet to be complete before the packet can be assigned a processor. In this case, the amount of blocking by the preceding packet is significant because the packet may wait in the prefetch unit for a substantial amount of time until the preceding packet is completely executed.

Upon the packet selector assigning a priority to each of the packets that are eligible for transfer to the prefetch unit, the packet selector can select from the packets having the same highest priority the oldest packet for transfer to the prefetch unit. The prefetch unit can then retrieve data to be used by a processor while processing of the packet. Various embodiments of the present disclosure will be better understood with reference to FIGS. 1-5.

FIG. 1 is a block diagram showing components of an embodiment of an integrated circuit device 100 of a data processing system 10 in accordance with at least one embodiment of the present disclosure. Device 100 can be an integrated circuit die, a packaged device that can include one or more integrated circuit die, a printed circuit board that can include one or more packaged devices and integrated circuit die, the like, and combinations thereof. Device 100 may be used to provide the switching features of a networking device, such as a router, switch, bridge, server, or another suitable network infrastructure component. In one implementation, device 100 includes processing system 102, memory 104, input/output interfaces 106, a queue manager 108, and a bus interface 109. The components of device 100 are interconnected by communication bus 110. The device 100 can communicate with other components, such as processor 112 and memory 114, via the bus interface 109 and the bus 116.

Processing system 102 generally represents the main processing core(s) or central processing unit(s) (CPU). In this regard, the processing system 102 executes applications and/or programs for the device 100, accesses memory 104, and interacts with other elements of the device 100 in a conventional manner, as will be appreciated in the art. In an embodiment, the processing system 102 is implemented or realized as a plurality of microprocessor cores, however, in alternative embodiments, the processing system 102 may be realized with at least one or more of the group a general purpose processor, a microprocessor, a microcontroller, a content addressable memory, a digital signal processor (DSP), an application-specific integrated circuit (ASIC), a field programmable gate array (FPGA), any suitable programmable logic device, discrete gate or transistor logic, discrete hardware components, or any combination thereof, designed to support and/or perform the functions described herein.

Memory 104 is configured to support operations of the processing system 102 as well as other components of the device 100 as will be appreciated in the art. In this regard, memory 104 functions as the main memory or primary memory for device 100. Depending on the implementation, memory 104 may be realized as RAM memory, ROM memory, flash memory, registers, hard disk, or another suitable storage medium known in the art or any suitable combination thereof.

Input/output interfaces 106 represents the components including hardware, software, or firmware of device 100 configured to support communications, such as input from and output to, between device 100 and one or more peripheral (or external) devices. In an exemplary embodiment, the input/output interfaces 106 are in communication with or include at least one communications interface, such as an Ethernet interface, configured to support data transmission to/from device 100 and other devices over a network 122, such as a local area network, a wireless network, or the like, in accordance with one or more data communication protocols, such as, for example, conventional Internet Protocol techniques, TCP/IP, hypertext transfer protocol (HTTP), IEEE 802.11 (any variation), IEEE 802.16 (WiMAX or any other variation), or another comparable protocol. In addition, input/output interfaces 106 may include other peripheral interfaces, such as, for example, Peripheral Component Interconnect (PCI) interfaces, RapidIO interfaces, Universal Serial Bus (USB) interfaces, and the like.

The queue manager 108 can support the transfer of data from the I/O interfaces 106 to any components that facilitate packet processing within the device 100. The device 100 may include a data processor such as a security processor 120 or security block to perform encryption and encryption actions on incoming data packets. The security processor 120, for example, may include specialized hardware acceleration for various networking-related functions.

The security processor 120 may be implemented as a software module executed by processing system 102, or may be implemented as a processing unit that is within processing system 102. The security processor 120 is configured to receive input data and perform encryption and decryption of that data. Depending upon the type of a particular input data packet, the security processor 120 retrieves ancillary data, such as commands and context, used in processing the data packet and executes the appropriate commands on the incoming data packet. The security processor 120 generally receives input data from the queue manager 108 provided by processing system 102 of device 100. The security processor 120 may support data processing functions for one or more security protocols, such as, for example, internet protocol security (IPsec), transport layer security (TLS) and/or secure sockets layer (SSL), secure real-time transport protocol (SRTP), the IEEE 802.1AE MAC security standard (MACsec), the IEEE 802.16e WiMax MAC layer, third generation radio link control (3GPP RLC), or another suitable protocol.

Figure 2:
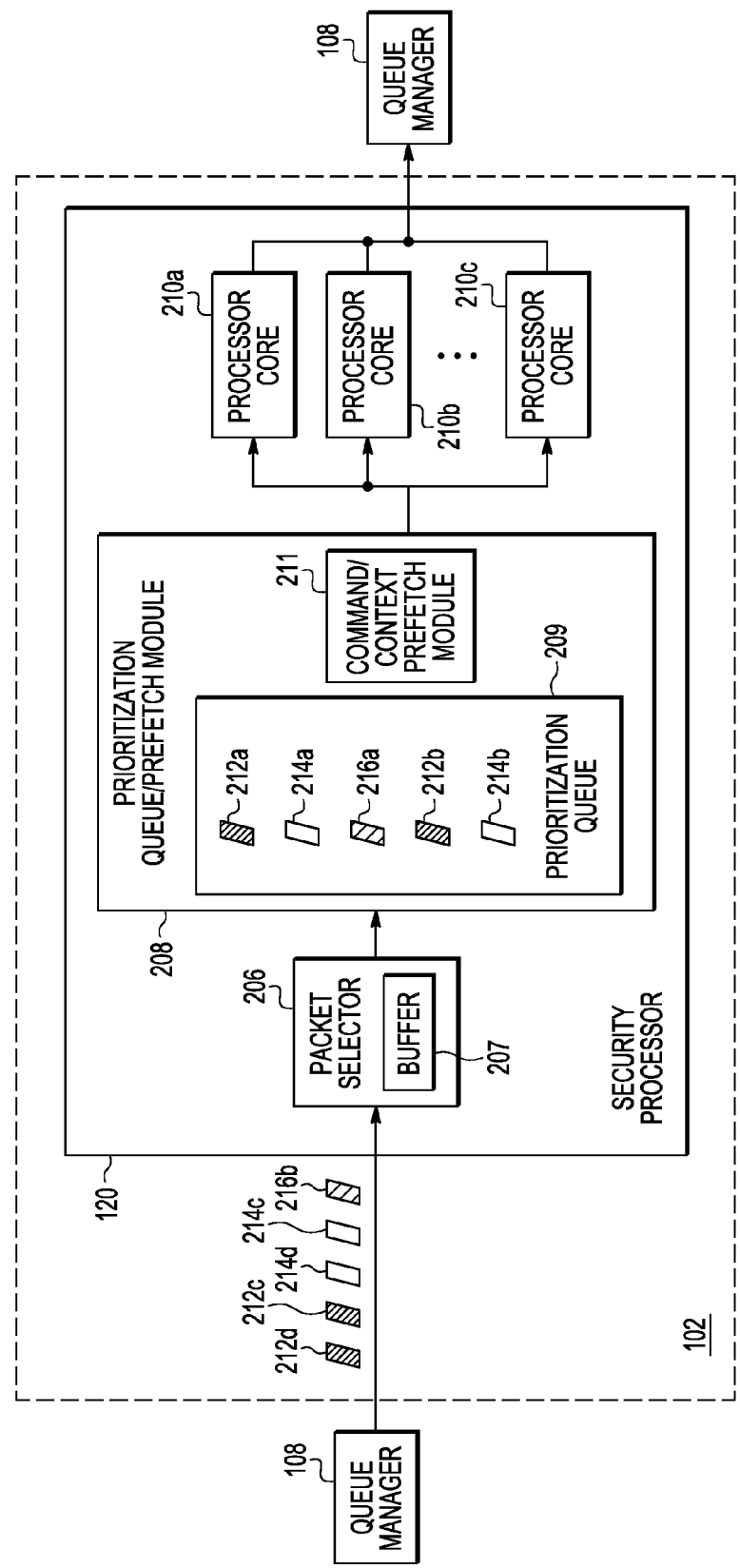
FIG. 2 is a block diagram showing the various devices of an embodiment of a data processor that may be implemented in conjunction with the data processing system of FIG. 1 in accordance with at least one embodiment of the present disclosure.

FIG. 2 is a block diagram showing the blocks of an embodiment of the processing system 102 of FIG. 1 in accordance with at least one embodiment of the present disclosure. In the present example, the processing system 102 includes the security processor 120, though other types of data processors may be utilized in conjunction with embodiments of the present systems and methods for ordering job processing. The security processor includes a packet selector 206, a prioritization queue/prefetch module 208 (referred to herein as prefetch unit 208), and processor cores 210a, 210b, and 210c. Each of the processor cores 210a, 210b, and 210c can be a processor core within the security processor 120. In an embodiment, the processor cores 210a, 210b, and 210c can be replaced with processes running on the security processor 120. The packet selector 206 includes a buffer 207. The prefetch unit 208 includes a prioritization queue 209 and a command/context prefetch module 211.

The queue manager 108 is in communication with the packet selector 206, which in turn is in communication with the prefetch unit 208. The prefetch unit 208 is in communication with the processor cores 210*a*, 210*b*, and 210*c*, which in turn are all in communication with the queue manager 108. The security processor 120 receives task or job assignments from processing system 102 of device 100 in the form of a number of input packets or frames, or references thereto, wherein each input packet or frame belongs to a particular communication stream or flow that is associated with a sequence of operations or tasks to be performed on the packets belonging to that flow.

For example, each packet received at security processor 120 can be associated with data that resides in memory 104 that includes various commands, metadata, payload data, or other information needed by the security processor 120 to perform and/or execute the one or more operations, tasks, processes and/or procedures that comprise the respective task, which are applied to the associated packet. Security processor 120 receives input packets for processing from processing system 102 of device 100 via queue manager 108.

Queue manager 108 maintains one or more queues that each contain one or more packets of data of a packet stream or that each contain packets of data from more than one packet stream that is to be processed by security processor 120. In order to retrieve data for processing, security processor 120 retrieves packets or packet references from queue manager 108 using a dequeue request. With each dequeue request, queue manager 108 delivers a number of packets to security processor 120 for processing.

Each packet is associated with a particular communication flow. For example, packets 212*a*, 212*b*, 212*c*, and 212*d* belong to the same communication flow, while packets 214*a*, 214*b*, 214*c*, and 214*d* belong to another communication flow, and packets 216*a* and 216*b* belong to still another communication flow. In general, packets belonging to the same communication flow are each processed using the same processing steps and therefore require the use of the same ancillary data. Accordingly, each input packet or reference to a packet is used in the prefetch unit 208 to create a job to be executed by processor core 210*a*, 201*b*, or 210*c*. For example, one communication flow may be undergoing decryption. In that case, each packet associated with that communication flow will be decrypted using the same commands and context, such as decryption keys, protocol information, and next packet sequence number. Different streams may call for the use of different encryption/decryption keys, and/or different sequences of processing steps, and the like.

To associate a particular packet with a particular communication flow, queue manager 108 provides metadata to security processor 120 that describes a relationship between each packet and a particular communication flow. In one implementation, the metadata includes a pointer to a memory location of the memory 104 that stores instructions for processing the particular communication flow. As such, the metadata describes a job to be performed by the security processor 120 on the input packet data.

After the dequeue command is transmitted to queue manager 108 and queue manager 108 transmits a number of dequeued packets or packet references to security processor 120, the dequeued packets are received by packet selector 206 and stored as an ordered list of packets in the buffer 207.

Packet selector 206 is a module of security processor 120 configured to determine the order in which packets received from queue manager 108 are to be processed. Packet selector 206 may store reference information for any appropriate number of packets.

Sometimes, the device 100 may be handling a small number of communication flows or streams, such that the device 100 includes more processors than communication streams or flows provided to the device 100. As a consequence, the security processor 120 may underutilize the capacity of the processor cores 210*a*-*c* within the security processor 120. In this case, utilization of the processor cores 210*a*-*c* can be increased by increasing the number of packets in the prefetch unit 208, which can then provide more jobs for execution to the processor cores 210*a*-*c*. For example, utilization of the processor cores 210*a*-*c* can be increased by placing multiple packets from the same communication flow into the prefetch unit 208 based on start time constraints of the packet within the communication flow and the processing status of a preceding packet in the communication flow.

To increase utilization of processing resources in the security processor 120, the packet selector 206 may, under certain conditions, transfer a packet to the prefetch unit 208 even if the packet is in the same communication stream or flow as a packet already in the prefetch unit 208 based on start time constraints for packet in the communication flow. Several criteria are evaluated to determine eligibility and relative priority for selection of a packet for transfer to the prefetch unit 208. In an embodiment, dequeue order is considered to ensure that jobs associated with the same stream or flow are processed in sequence and to enforce fairness in selection between different flows. Eligibility and priority can be continuously evaluated while waiting for space in the prefetch unit, so that selection takes into account the latest conditions of the data processor.

In some embodiments, the packet selector 206 first determines a packet's eligibility for transfer to the prefetch unit 208 and then assigns a priority for selection of the packet. A packet is eligible for transfer if the packet is the first packet in a communication flow or stream, such as packets 212*a*, 214*a*, and 216*a*. A packet is also eligible for transfer to the prefetch unit 208 if the preceding packet in the flow is already being executed or is complete. These eligibility rules preserve space in the staging area of the prefetch unit 208 for packets from other communication flows. This improves the utilization of the security processor 120 when the number of flows exceeds the number of jobs that can be handled in the prefetch unit 208. However, when the number of flows is smaller, the capacity of the prefetch unit 208 is not fully utilized. In an embodiment, this situation can be resolved by making a packet eligible for transfer to the prefetch unit 208 if the preceding packet is in the prefetch unit 208 and certain start time constraints apply to the flow, as discussed below.

Once a packet is eligible for transfer into the staging area, packet selector 206 can assign the packet a selection priority depending on start time constraints for the communication flow and a processing status of a preceding packet from the same communication flow. Once priorities are assigned, the list of packets waiting for transfer to the prefetch unit 208 can be traversed in dequeue order to find the oldest packet with the highest priority, and that packet can then be transferred to the staging area of the prefetch unit 208. The determining of whether a packet is eligible for transfer to the prefetch unit 208, and assigning of priorities to the packet will be described with respect to FIGS. 3A-E below.

After the prefetch unit 208 has retrieved both the commands and context as well as packet data for the incoming packet, the prefetch unit 208 transfers the packet and associated data to one of processor cores 210a-c of security processor 120 for processing or execution when a processor is available. Processor cores 210a-c may include specialized controllers configured to perform data protection jobs in conjunction with cryptographic hardware acceleration blocks. Processor cores 210a-c may include specialized cryptographic hardware accelerators, such as, for example, an Advanced Encryption Standard (AES) unit, a Cyclic Redundancy Check (CRC) accelerator, a Data Encryption Standard (DES) execution unit, a KASUMI execution unit, a SNOW hardware accelerator, a message digest execution unit, a public key execution unit, a Random Number Generator (RNG), and the like.

After the packet data is processed, security processor 120 outputs the processed data to queue manager 108, which can be the same queue manager as for the input process using an enqueue process. As security processor 120 completes the processing of incoming packets 212, additional packets are dequeued from queue manager 108 to ensure that security processor 120 has a continual flow of incoming packets for processing.

During the operation of security processor 120, as the different incoming packets are processed, prefetch unit 208 fetches different commands and context for the data streams in which the different packets belong. If packets from different streams are processed after one another, prefetch unit 208 continuously retrieves new commands and context to allow the processing to take place. Sometimes the commands and context are retrieved from relatively slow storage devices, resulting in a decreased efficiency of the security processor. If, however, multiple packets from the same stream were to be processed sequentially, the commands and context can be reused, preventing the prefetch unit 208 from having to prefetch those commands and context. In that case, security processor 120 operates more efficiently because the prefetch unit is not required to fetch new information and data to allow processing to take place.

Figure 3A:
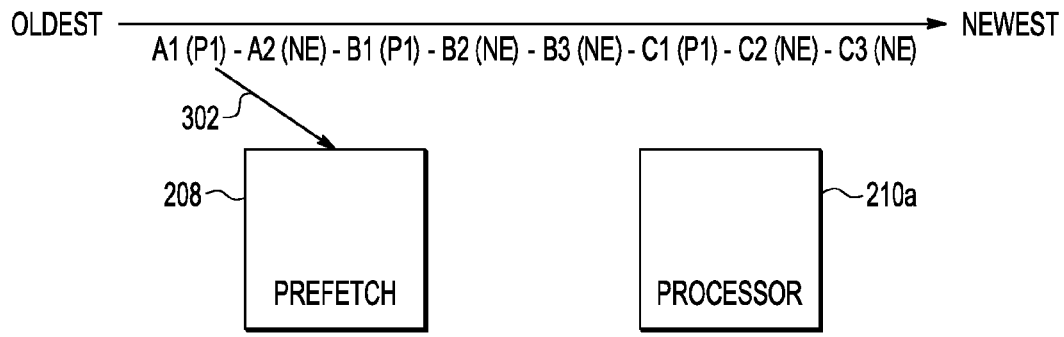
FIGS. 3A-3E are illustrations showing an exemplary implementation of a method for transferring packets to a prefetch unit in the data processor of FIG. 2 in accordance with at least one embodiment of the present disclosure.

FIGS. 3A-E illustrate an example implementation of a method for ordering packet selection in the data processor of FIG. 2 in accordance with at least one embodiment of the present disclosure. FIG. 3A shows an ordered list of packets resulting from a dequeue command issued by the packet selector 206. The packets in this example are associated with one of three flows A, B, and C and are listed from oldest to newest dequeued packet. In FIG. 3A, the packets include two packets from flow A, three packets from flow B, and three packets from flow C. In this embodiment, packets from the three flows have different start time constraints for assigning a selection priority to the packets. For example, a start of the processing of a packet in flow A must wait for completion of the processing of a preceding packet in the flow. In flow B, a start of the processing of a packet must wait for partial completion of the processing of a preceding packet in the flow. In flow C, a start of the processing of a packet must wait for the start of processing of a preceding packet in the flow.

The packets can be ordered, such that a packet A1 is to be executed before a packet A2, packet B1 is to be partially executed before packet B2 starts, packet B2 is to be partially executed before packet B3 starts, packet C1 is to start execution before packet C2 starts, and packet C2 is to start execution before packet C3 starts. Each of the packets is assigned a priority which can vary from the highest priority P1, to a second highest priority P2, to a third highest priority P3, and not eligible (NE).

At the time the depicted ordered list of packets was retrieved, no packet is located in the prefetch unit 208 or is being executed in processor core 210a. Packets A2, B2, B3, C2, and C3 are not eligible for transfer and have a corresponding priority of NE. These packets are not eligible because preceding packets from the same flows are in the ordered list of packets, such that the preceding packet is not in the prefetch unit 208 or being executed in the processor core 210a. With respect to packet A2, a preceding packet A1 is in the ordered packet list. With respect to packet B2, a preceding packet B1 is in the ordered list of packets. With respect to packet B3, preceding packets B1 and B2 are in the ordered packet list. With respect to packet C2, preceding packet C1 is in the ordered list of packets. With respect to packet C3, preceding packets C1 and C2 are in the ordered list of packets.

After the packet selector 206 determines which packets are eligible for transfer to the prefetch unit 208, the packet selector 206 assigns priorities to each eligible packet according to the start time constraints described above. The packet selector 206 assigns each of the packets A1, B1, and C1 a priority of P1 because each packet A1, B1, and C1 are the first packet of their respective communication flow.

Accordingly, given the packet listing in FIG. 3A, the packet selector 206 transfers packet A1 into the prefetch unit 208 for processing and job creation as indicated by arrow 302. In this case, packet A1 is transferred to the prefetch unit 208 based on packet A1 being the oldest packet with the highest priority level in the ordered list of packets.

Figure 3B:
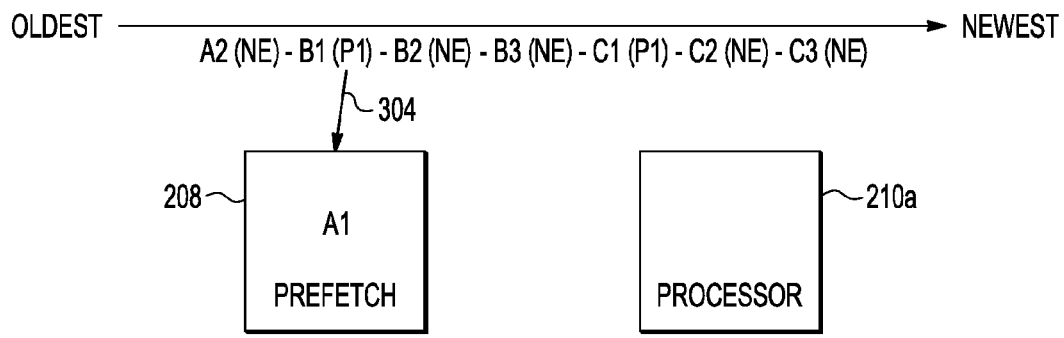

FIG. 3B shows the ordered list of packets status after packet A1 is transferred into the prefetch unit 208. Packets B1 and C1 remain at the highest priority of P1. With respect to packet A2, the start time constraint for flow A is that the start of the processing of A2 must wait for completion of the preceding packet A1, which is located in the prefetch unit 208. In this case, packet A1 significantly blocks the processing of the packet A2. For example, packet A2 may sit in the prefetch unit 208 for a relatively long period until the processing of the preceding packet A1 is completed. With respect to packet B2, preceding packet B1 is in the ordered list of packets. With respect to packet B3, preceding packets B1 and B2 are in the ordered packet list. With respect to packet C2, preceding packet C1 is in the ordered list of packets. With respect to packet C3, preceding packets C1 and C2 are in the ordered packet list. Thus, packets A2, B2, and C2 remain not eligible for transfer to the prefetch unit 208.

Given the priorities shown in FIG. 3B, the packet selector 206 transfers packet B1 into the prefetch unit 208, as indicated by arrow 304, based on packet B1 is the oldest packet having the highest priority of available packets.

Figure 3C:
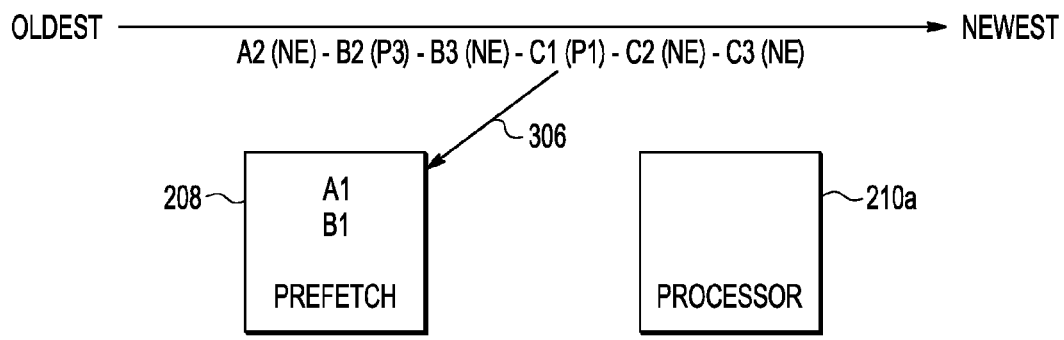

FIG. 3C shows the ordered list of packets status after packet B1 is transferred into the prefetch unit 208. Here, packets A1 and B1 are in the prefetch unit 208. Packets A2, B3, C2, and C3 are still ineligible for transfer into prefetch unit 208. Packet A2 is not eligible for transfer because the start time constraint for flow A is that the start of the processing of A2 must wait for completion of the preceding packet A1, which is still located in the prefetch unit 208. Packet B3 is ineligible because preceding packet B2 is present in the ordered packet list. Packets C2 and C3 are ineligible because preceding packet C1 is already present in the ordered packet list.

However, the packet selector 206 assigns Packet B2 a third highest priority of P3, based on the start time constraint for flow B defining that the start of the processing of packet B2 must wait for partial completion of the processing of preceding packet B1 and packet B1 is still in the prefetch unit 208. In this case, blocking of the packet B2 to be assigned to the processor core 210*a* by packet B1 will be limited. For example, packet B2 can be assigned to a processor core, process, or processor thread before the execution/processing of the preceding packet B1 is complete. The packet selector 206 transfers packet C1 to the prefetch unit 206, as indicated by arrow 306, based on packet C1 having the highest priority.

Figure 3D:
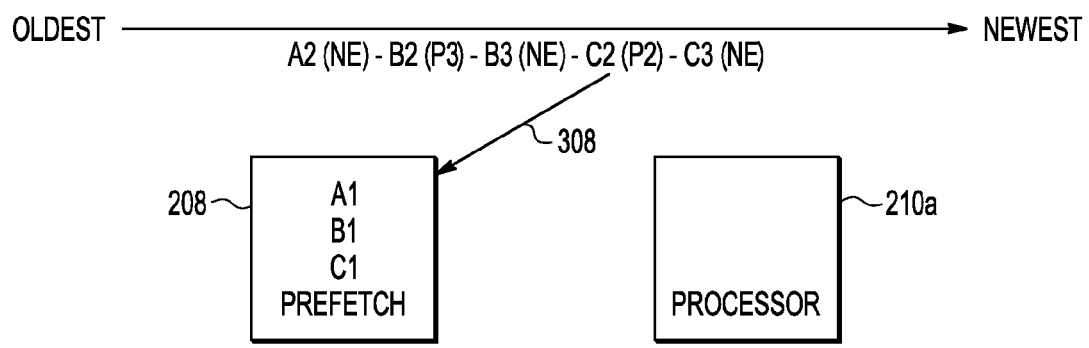

FIG. 3D shows the ordered list of packets status after the packet selector 206 transfers packet C1 into the prefetch unit 208. Here, packets A1, B1, and C1 are in the prefetch unit 208. Packets A2, B3, and C3 are still not eligible for transfer to the prefetch unit 208. Packet A2 is not eligible for transfer because the start time constraint for flow A is that the start of the processing of A2 must wait for completion of the preceding packet A1, which is still located in the prefetch unit 208. Packet B3 is ineligible because preceding packet B2 is present in the ordered packet list. Packet C3 is ineligible for transfer because preceding packet C2 is still present in the ordered packet list.

Packet B2 is still assigned a third highest priority of P3, because the start of the processing of packet B2 must wait for partial completion of the processing of a preceding packet B1 and packet B1 is still in the prefetch unit 208. Packet C2 is now assigned a second highest priority of P2 based on the start time constraints of the communication flow C, which is that the start of the processing of packet C2 must wait for the start of processing of preceding packet C1. In this case, packet C1 may only slightly block the processing of C2, since the processing of C2 can start immediately after the start of the processing of C1. According to the current priorities, the packet selector 206 transfers packet C2 into the prefetch unit 208, as indicated by arrow 308.

Figure 3E:
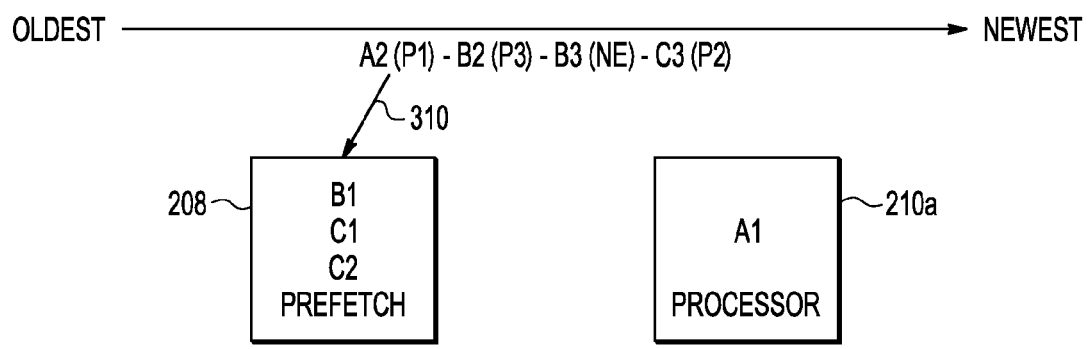

FIG. 3E shows the ordered list packets status after the packet selector 206 transfers packet C2 into the prefetch unit 208. Here, packets B1, C1, and C2 are in the prefetch unit 208, and packet A1 is being executed by processor 208*a*. Packet B3 is still not eligible for transfer to the prefetch unit 208, based on preceding packet B2 is present in the ordered packet list.

Packet B2 is still assigned the third highest priority of P3, because the start of the processing of packet B2 must wait for partial completion of the processing of a preceding packet B1 and packet B1 is still in the prefetch unit 208. Packet C3 is now assigned a second highest priority of P2 based on the start time constraints of the communication flow C, which is that the start of the processing of packet C3 must wait for the start of processing of preceding packet C2 and packet C2 being in the prefetch unit 208. Packet A2 is now assigned the highest priority of P1 because the preceding packet in the flow is already being processed. According to the current priorities, the packet selector 206 transfers packet A2 into the prefetch unit 208, as indicated by arrow 310.

The algorithm illustrated by FIGS. 3A-3E is the same regardless of the number of execution units, or processors present within a data processing system. When selecting a packet for transfer, the algorithm considers only whether other packets are in the ordered packet list, in the prefetch unit 208, or currently being executed in determining a priority for a particular packet. The number of execution units or processors does not affect the selection method. Accordingly, the algorithm is equally applicable to a processing system including a single execution unit or processor or many execution units or processors.

Figure 4:
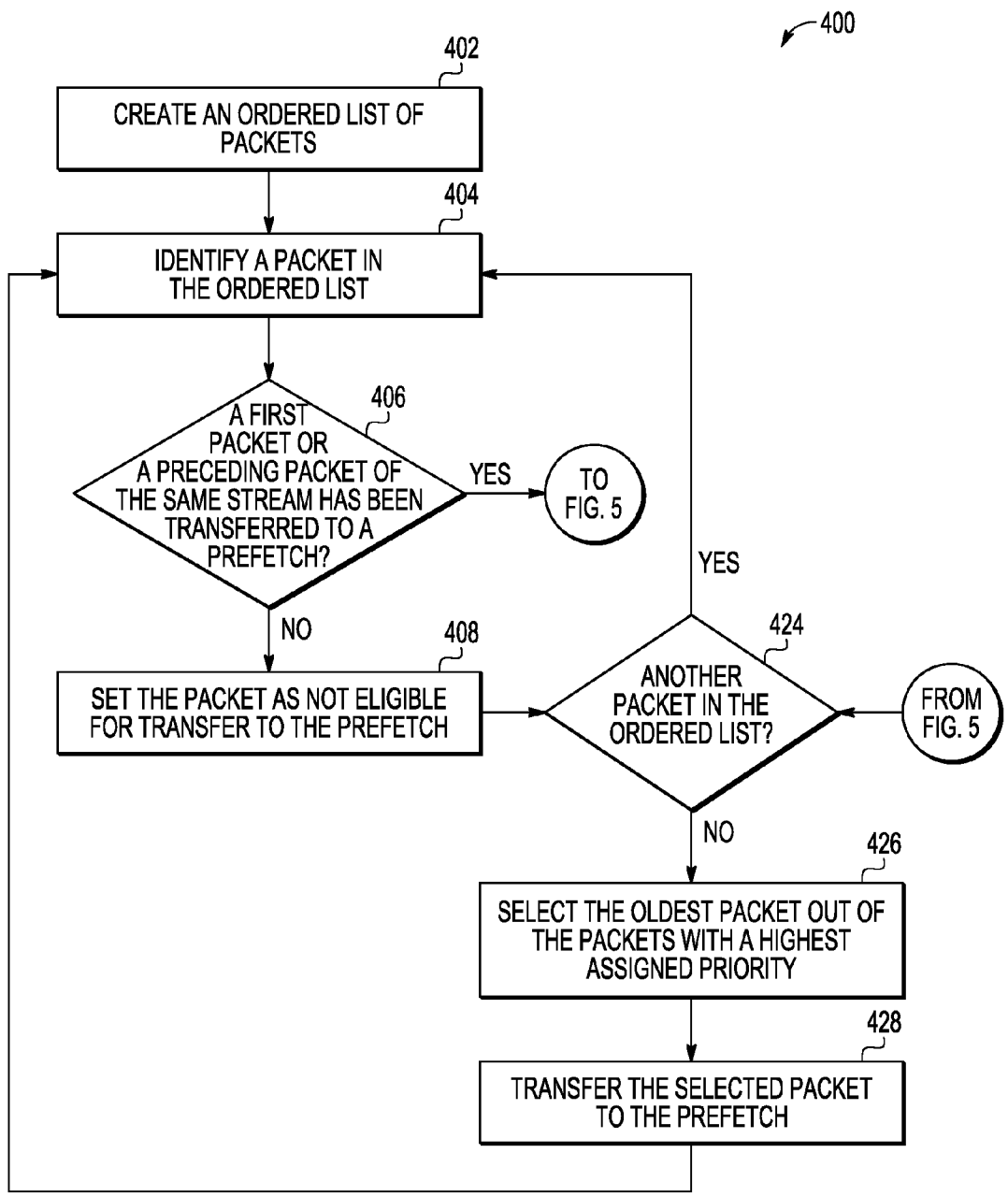
FIGS. 4-5 are a flow chart illustrating an embodiment of a method for selecting jobs for transfer to the prefetch unit in order to minimize the likelihood of contention between packets that can be implemented in the processing system of FIG. 1 in accordance with at least one embodiment of the present disclosure.
Figure 5:
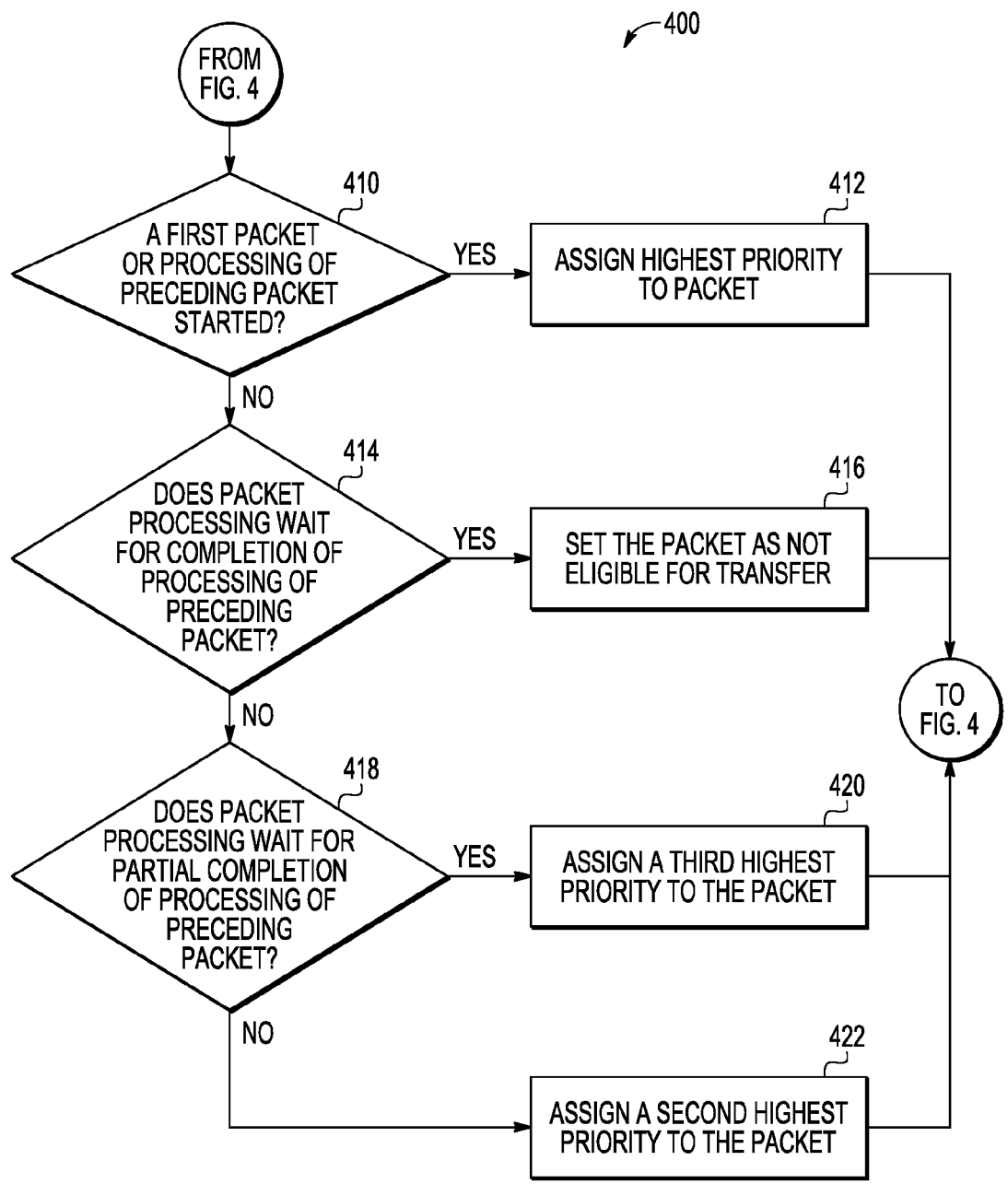

FIGS. 4 and 5 are a flow chart illustrating an embodiment of a method 400 for selecting packets for transfer to a prefetch unit 208 in order to minimize the likelihood of contention for processing resources between packets that can be implemented in the processing system 100 of FIG. 1 in accordance with at least one embodiment of the present disclosure. At block 402, the packet selector 206 creates an ordered list of packets to be executed by the processor cores 210*a*-208*c*. The packets are part of one or more ordered communication flows, such that each of the packets in a particular communication stream should be executed in a certain order. At block 404, the packet selector 206 identifies a packet in the ordered list. At block 406, a determination is made whether the identified packet is a first packet or whether a preceding packet in the same communication flow as the identified packet has been transferred to the prefetch unit 208. If the identified packet is not the first packet and the preceding packet has not been transferred to the prefetch unit 208, the packet selector 206 sets the packet as not eligible for transfer to the prefetch unit 208 at block 408. This ensures that preparation of the jobs associated with packets in the prefetch unit 208 start in order, since packets from the same flow must start processing in order. If the packet is a first packet or the preceding packet has been transferred to the prefetch unit 208, determination of eligibility and assignment of a selection priority continues at block 410.

At block 410, the packet selector 206 determines whether the identified packet is the first packet of a flow or processing of the preceding packet has started in a processor core 210*a*, 210*b*, or 210*c*. If the identified packet is the first packet of a flow or processing of the preceding packet has started, the packet selector 206 assigns a highest selection priority level to the packet at block 412. In this case, the assignment of the packet to a processor core 210*a*, 210*b*, or 210*c* will not be blocked by another packet from the same flow in the prefetch unit 208.

If the processing of the preceding packet has not started, the packet selector 206 determines if the start time constraint for the packet requires completion of the processing of the preceding packet at block 414. If the start constraint for the packet requires completion of the processing of the preceding packet, the packet selector 206 sets the packet as not eligible for transfer to the prefetch unit 208 at block 416. In this case, the blocking of the processing of the packet is significant. For example, the packet may sit in the prefetch unit for a relatively long period until the processing of the preceding packet is complete.

If the start time constraint for the packet does not require completion of the processing of the preceding packet, the packet selector 206 determines whether the start constraint for the packet requires partial completion of the processing of the preceding packet at block 418. If the start constraint for the packet requires partial completion of the processing of the preceding packet, the packet selector 206 assigns a third highest selection priority level to the packet at block 420. In this case, blocking of the packet to be assigned to a processor core 210*a*, 210*b*, or 210*c* by the preceding packet will be limited. For example, the packet can be assigned to a processor core 210*a*, 210*b*, or 210*c* before the execution/processing of the preceding packet is complete.

If the start constraint for the packet does not require partial completion of the processing of the preceding packet, the packet selector 206 assigns a second highest selection priority level to the packet at block 422. In this case, the start constraint for the packet allows its processing to start immediately after start of processing of the preceding packet, so blocking of the packet to be assigned to a processor core 210*a*, 210*b*, or 210*c* by the preceding packet will be minimal.

At block 424, the packet selector 206 determines whether there is another packet in the ordered list to assign a priority level. If there is another packet in the ordered list to assign a priority level, the flow continues as stated above at block 404. If there is not another packet in the ordered list to assign a priority level, the packet selector 206 selects the oldest packet out of the packets with a highest assigned priority at block 426. At block 428, the packet selector 206 transfers the selected packet to the prefetch unit 208 and the flow continues as stated above at block 404. In an embodiment, the packets with the highest assigned priority is any number of packets in the ordered list that have the same priority without having other packets having a higher assigned priority. For example, all of the packets that are assigned a highest priority, all of the packets that are assigned the second highest priority and no packet has the highest priority, or the like. In an embodiment, all of the packets in the ordered list can be set as not eligible. In this situation, the flow can continue between blocks 404, 406, 408, and 424 until a new packet is added to the ordered list or an existing packet in the prefetch unit 208 is moved to processor core 210*a* to start execution.

In accordance with one aspect of the present disclosure, a method of processing a packet within a processor is provided. In one embodiment, the method includes creating, by a packet selector, an ordered list of packets. In this case, each packet corresponds to a respective communication flow. The method also includes determining whether each packet in the ordered list of packets is eligible for transfer to a prefetch unit based on whether a preceding packet in the same communication flow has been transferred to the prefetch unit. The method further includes setting, by the packet selector, a selection priority for each packet based on start time constraints for the respective communication flow, and based on a processing status of a preceding packet in the communication flow. The method also includes sending an oldest packet out of packets having a highest selection priority to the prefetch unit.

In one embodiment, the start time constraints include: processing of the packet must wait for start of processing of the preceding packet, processing of the packet must wait for partial completion of processing of the preceding packet, and processing of the packet must wait for completion of processing of the preceding packet. In one embodiment, setting the selection priority for each packet includes: setting the selection priority of a packet to a highest priority of a set of priorities based on processing of the preceding packet at least being started. Setting the selection priority for each packet also includes setting the selection priority of the packet to a second highest priority of the set of priorities based on the preceding packet being in the prefetch unit, and the start time constraint of the packet allows the packet to start immediately after the start of the processing of the preceding packet. Setting the selection priority for each packet further includes setting the selection priority of the packet to a third highest priority of the set of priorities based on the preceding packet being in the prefetch unit, and the start time constraint of the packet allows the packet to start after partial completion of processing of the preceding packet. Setting the selection priority for each packet also includes setting the selection priority of the packet to not eligible based on the preceding packet being in the prefetch unit, and the start time constraint of the packet requires completion of the processing of the preceding packet.

In one embodiment, consideration of the start time constraint provides more packets to multiple processor cores of the processor than communication flows. In one embodiment, the method also includes processing the oldest packet out of the packets having the highest selection priority. In this case, processing the oldest packet includes retrieving data used in processing the oldest packet. In one embodiment, the data includes commands for processing the oldest packet. In one embodiment, the data includes a security key for processing the oldest packet.

In accordance with one aspect of the present disclosure, a data processor is provided. The data processor includes a packet selector that creates an ordered list of packets. In this case, each packet corresponds to a respective communication flow. The packet selector further determines whether each packet in the ordered list of packets is eligible for transfer to a prefetch unit based on whether a preceding packet in the same communication flow has been transferred to the prefetch unit, and sets a selection priority for each packet based on start time constraints for the respective communication flow, and based on a processing status of a preceding packet in the communication flow.

In one embodiment, the data processor further includes the prefetch unit to retrieve data associated with a packet that is eligible for transfer and has been stored in the prefetch unit. In this case, the prefetch unit receives an oldest packet out of packets having a highest selection priority from the packet selector. In one embodiment, the start time constraints include: processing of the packet must wait for start of processing of the preceding packet, processing of the packet must wait for partial completion of processing of the preceding packet, and processing of the packet must wait for completion of processing of the preceding packet.

In one embodiment, the packet selector sets the selection priority of a packet to a highest priority of a set of priorities based on processing of the preceding packet being started. The packet selector also sets the selection priority of the packet to a second highest priority of the set of priorities based on the preceding packet being in the prefetch unit, and the start time constraint of the packet allows the packet to start immediately after the start of the processing of the preceding packet. The packet selector further sets the selection priority of the packet to a third highest priority of the set of priorities based on the preceding packet being in the prefetch unit, and the start time constraint of the packet allows the packet to start after partial completion of processing of the preceding packet. The packet selector also sets the selection priority of the packet to not eligible based on the preceding packet being in the prefetch unit, and the start time constraint of the packet requires completion of the processing of the preceding packet.

In one embodiment, the start time constraint provides more packets to the multiple processors than communication flows. In one embodiment, the data processor further includes multiple processor cores that process the oldest packet out of the packets having the highest selection priority. In one embodiment, a prefetch unit retrieves data used by the processor cores to process the oldest packet in the prefetch unit. In one embodiment, the data includes commands for the processor core to process the oldest packet. In this case, the data includes a security key for the processor core to process the oldest packet In accordance with one aspect of the present disclosure, a method of processing a packet within a processor is provided. The method includes creating, by a packet selector, an ordered list of packets. In this case, each packet corresponds to a respective communication flow. The method also includes determining whether each packet in the ordered list of packets is eligible for transfer to a prefetch unit based on whether the packet is a first in order packet, a preceding packet in the same communication flow has been transferred to the prefetch unit, processing of the preceding packet in the same communication flow has started, or the processing of the preceding packet in the same communication flow is complete. The method further includes setting, by the packet selector, a selection priority for each packet based on start time constraints for the respective communication flow, and based on a processing status of a preceding packet in the communication flow. The method also includes sending an oldest packet out of packets having a highest selection priority to the prefetch unit.

In one embodiment, the start time constraints include: processing of the packet must wait for start of processing of the preceding packet, processing of the packet must wait for partial completion of processing of the preceding packet, and processing of the packet must wait for completion of processing of the preceding packet. In one embodiment setting the selection priority for each packet includes setting the selection priority of a packet to a highest priority of a set of priorities based on one of the following: the packet being a first in order packet, and processing of the preceding packet at least being started. Setting the selection priority for each packet also includes setting the selection priority of the packet to a second highest priority of the set of priorities based on the preceding packet being in the prefetch unit, and the start time constraint of the packet allows the packet to start immediately after the start of the processing of the preceding packet. Setting the selection priority for each packet further includes setting the selection priority of the packet to a third highest priority of the set of priorities based on the preceding packet being in the prefetch unit, and the start time constraint of the packet allows the packet to start after partial completion of processing of the preceding packet. Setting the selection priority for each packet also includes setting the selection priority of the packet to not eligible based on the preceding packet being in the prefetch unit, and the start time constraint of the packet requires completion of the processing of the preceding packet.

Also, the concepts have been described with reference to specific embodiments. However, one of ordinary skill in the art appreciates that various modifications and changes can be made without departing from the scope of the present disclosure as set forth in the claims below. For example, FIG. 1 illustrates that the components are in communication via bus 110, however one of ordinary skill in the art appreciates that the components can also be in communication with each other via additional bus or interfaces, such as a side band communication channel. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method of processing a packet within a processor, the method comprising:
    creating, by a packet selector, an ordered list of packets, each packet of the ordered list of packets corresponding to a respective communication flow;
    determining whether each packet of the ordered list of packets is eligible for transfer to a prefetch unit based on whether a preceding packet in the same communication flow has been transferred to the prefetch unit;
    determining whether each packet in the respective communication flow can be processed before processing of the preceding packet in the respective communication flow has finished;
    identifying start time constraints for the respective communication flow based upon the determination of whether each packet in the respective communication flow can be processed before processing of the preceding packet in the respective communication flow has finished;
    setting, by the packet selector, a selection priority for each packet of the ordered list of packets based on the start time constraints for the respective communication flow of each packet, and based on a processing status of the preceding packet in the respective communication flow; and
    sending an oldest packet out of the ordered list of packets having a highest selection priority to the prefetch unit.

2. The method of claim 1, wherein the start time constraints comprise: processing of the packet must wait for start of processing of the preceding packet, processing of the packet must wait for partial completion of processing of the preceding packet, and processing of the packet must wait for completion of processing of the preceding packet.

3. The method of claim 1, wherein setting the selection priority for each packet of the ordered list of packets includes:
    setting the selection priority of a packet to a highest priority of a set of priorities based on processing of the preceding packet at least being started;
    setting the selection priority of the packet to a second highest priority of the set of priorities based on the preceding packet being in the prefetch unit, and the start time constraint of the packet allows the packet to start immediately after the start of the processing of the preceding packet;
    setting the selection priority of the packet to a third highest priority of the set of priorities based on the preceding packet being in the prefetch unit, and the start time constraint of the packet allows the packet to start after partial completion of processing of the preceding packet; and
    setting the selection priority of the packet to not eligible based on the preceding packet being in the prefetch unit, and the start time constraint of the packet requires completion of the processing of the preceding packet.

4. The method of claim 1, further comprising:
    processing the oldest packet out of the packets having the highest selection priority.

5. The method of claim 4, wherein processing the oldest packet includes retrieving data used in processing the oldest packet.

6. The method of claim 5, wherein the data includes commands for processing the oldest packet.

7. The method of claim 5, wherein the data includes a security key for processing the oldest packet.

8. A data processor, the data processor comprising:
    a packet selector, the packet selector creates an ordered list of packets, each packet of the ordered list of packets corresponding to a respective communication flow, determines whether each packet of the ordered list of packets is eligible for transfer to a prefetch unit based on whether a preceding packet in the same communication flow has been transferred to the prefetch unit, determines whether each packet in the respective communication flow can be processed before processing of the preceding packet in the respective communication flow has finished, identifies start time constraints for the respective communication flow based upon the determination of whether each packet in the respective communication flow can be processed before processing of the preceding packet in the respective communication flow has finished, sets a selection priority for each packet of the ordered list of packets based on the start time constraints for the respective communication flow of each packet, and based on a processing status of the preceding packet in the respective communication flow, and sends an oldest packet out of the ordered list of packets having a highest selection priority to the prefetch unit.

9. The data processor of claim 8, wherein the start time constraints comprise: processing of the packet must wait for start of processing of the preceding packet, processing of the packet must wait for partial completion of processing of the preceding packet, and processing of the packet must wait for completion of processing of the preceding packet.

10. The data processor of claim 8, wherein the packet selector sets the selection priority, by: setting the selection priority of a packet to a highest priority of a set of priorities based on processing of the preceding packet being started, setting the selection priority of the packet to a second highest priority of the set of priorities based on the preceding packet being in the prefetch unit, and the start time constraint of the packet allows the packet to start immediately after the start of the processing of the preceding packet, setting the selection priority of the packet to a third highest priority of the set of priorities based on the preceding packet being in the prefetch unit, and the start time constraint of the packet allows the packet to start after partial completion of processing of the preceding packet, and setting the selection priority of the packet to not eligible based on the preceding packet being in the prefetch unit, and the start time constraint of the packet requires completion of the processing of the preceding packet.

11. The data processor of claim 8, further comprising:
multiple processor cores that process the oldest packet out of the packets having the highest selection priority.

12. The data processor of claim 11, wherein the prefetch unit retrieves data used by the multiple processor cores to process the oldest packet in the prefetch unit.

13. The data processor of claim 12, wherein the data includes commands for the multiple processor cores to process the oldest packet.

14. The data processor of claim 13, wherein the data includes a security key for the multiple processor cores to process the oldest packet.

15. A method of processing a packet within a processor, the method comprising:

creating, by a packet selector, an ordered list of packets, each packet corresponding to a respective communication flow;

determining whether each packet in the ordered list of packets is eligible for transfer to a prefetch unit based on whether the packet is a first in order packet, a preceding packet in the same communication flow has been transferred to the prefetch unit, processing of the preceding packet in the same communication flow has started, or the processing of the preceding packet in the same communication flow is complete;

determining whether each packet in the respective communication flow can be processed before processing of the preceding packet in the respective communication flow has finished;

identifying start time constraints for the respective communication flow based upon the determination of whether each packet in the respective communication flow can be processed before processing of the preceding packet in the respective communication flow has finished;

setting, by the packet selector, a selection priority for each packet of the ordered list of packets based on the start time constraints for the respective communication flow of each packet, and based on a processing status of the preceding packet in the respective communication flow; and sending an oldest packet out of the ordered list of packets having a highest selection priority to the prefetch unit.

16. The method of claim 15, wherein the start time constraints comprise: processing of the packet must wait for start of processing of the preceding packet, processing of the packet must wait for partial completion of processing of the preceding packet, and processing of the packet must wait for completion of processing of the preceding packet.

17. The method of claim 16, wherein setting the selection priority for each packet of the ordered list of packets includes:

setting the selection priority of a packet to a highest priority of a set of priorities based on one of the following: the packet being a first in order packet, and processing of the preceding packet at least being started;

setting the selection priority of the packet to a second highest priority of the set of priorities based on the preceding packet being in the prefetch unit, and the start time constraint of the packet allows the packet to start immediately after the start of the processing of the preceding packet;

setting the selection priority of the packet to a third highest priority of the set of priorities based on the preceding packet being in the prefetch unit, and the start time constraint of the packet allows the packet to start after partial completion of processing of the preceding packet; and setting the selection priority of the packet to not eligible based on the preceding packet being in the prefetch unit, and the start time constraint of the packet requires completion of the processing of the preceding packet.

* * * * *